United States Patent
Douglas et al.

(10) Patent No.: US 10,778,681 B1
(45) Date of Patent: Sep. 15, 2020

(54) USING COMMON IDENTIFIERS RELATED TO LOCATION TO LINK FRAUD ACROSS MOBILE DEVICES

(71) Applicant: Capital One Services, LLC, McLean, VA (US)

(72) Inventors: Lawrence H. Douglas, McLean, VA (US); Eric Volles, Mechanicsville, VA (US); Ya Liu, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/383,164

(22) Filed: Apr. 12, 2019

(51) Int. Cl.
| | |
|---|---|
| *H04L 29/06* | (2006.01) |
| *G06F 15/16* | (2006.01) |
| *G06F 7/04* | (2006.01) |
| *G06F 16/2457* | (2019.01) |
| *G06N 20/00* | (2019.01) |

(52) U.S. Cl.
CPC .... *H04L 63/0876* (2013.01); *G06F 16/24578* (2019.01); *G06N 20/00* (2019.01); *H04L 63/0861* (2013.01); *H04L 63/1425* (2013.01)

(58) Field of Classification Search
CPC ............. H04L 63/0876; H04L 63/0861; H04L 63/1425; G06N 20/00; G06F 16/24578
USPC .......................................................... 726/6
See application file for complete search history.

(56) References Cited

U.S. PATENT DOCUMENTS

| | | | |
|---|---|---|---|
| 7,376,431 B2 | 5/2008 | Niedermeyer | |
| 8,386,386 B1 | 2/2013 | Zhu | |
| 8,559,926 B1 | 10/2013 | Zang et al. | |
| 8,655,314 B1 | 2/2014 | Zang et al. | |
| 8,819,769 B1* | 8/2014 | van Dijk | H04L 67/303 726/1 |
| 2006/0282660 A1* | 12/2006 | Varghese | G06Q 20/341 713/155 |
| 2009/0083184 A1 | 3/2009 | Eisen | |
| 2013/0167196 A1* | 6/2013 | Spencer | H04W 8/22 726/3 |
| 2014/0137199 A1* | 5/2014 | Hefetz | G06Q 20/32 726/3 |
| 2014/0289867 A1* | 9/2014 | Bukai | G06Q 20/4016 726/28 |

(Continued)

OTHER PUBLICATIONS

Pallapa Venkataram; A Method of Fraud & Intrusion Detection for E-payment Systems in Mobile e-Commerce; IEEE: 2007; pp. 395-401 (Year: 2007).*

(Continued)

*Primary Examiner* — Monjur Rahim (74) *Attorney, Agent, or Firm* — Hunton Andrews Kurth LLP (57) ABSTRACT

Embodiments of the present disclosure provide systems, methods, and devices for countering fraudulent transactions by identifying devices associated with fraudulent activity. Examples relate to a system which compares identification parameters of devices associated with fraudulent activity, directly or indirectly, to identification parameters of a particular device. Based on the comparison, a confidence score may be generated may relate to the risk of fraud associated with that device. In some examples, the system may challenge a user with additionally security questions if the confidence score associated with a device indicates an increased risk of fraud.

20 Claims, 8 Drawing Sheets

System 100

(56) References Cited

U.S. PATENT DOCUMENTS

| | | | |
|---|---|---|---|
| 2016/0005029 A1* | 1/2016 | Ivey | G09C 1/00 |
| | | | 705/44 |
| 2016/0210450 A1 | 7/2016 | Su | |
| 2018/0247312 A1* | 8/2018 | Loganathan | G06Q 20/32 |
| 2018/0264347 A1* | 9/2018 | Tran | G16H 50/20 |
| 2019/0139044 A1* | 5/2019 | Piel | G06Q 20/3226 |
| 2019/0139048 A1* | 5/2019 | Senci | G06Q 20/12 |
| 2019/0190884 A1* | 6/2019 | Shaikh | H04L 61/2007 |

OTHER PUBLICATIONS

White Paper "Detecting and Preventing Banking Application Fraud", SAS Institute Inc, SAS.com/Fraud, 109917 (8 pages).

* cited by examiner

USING COMMON IDENTIFIERS RELATED TO LOCATION TO LINK FRAUD ACROSS MOBILE DEVICES

FIELD OF THE INVENTION

This disclosure relates to a counter fraud system which analyzes device signatures to determine if a device is associated with fraudulent activity.

BACKGROUND

Fraud detection is an increasingly necessary aspect of commerce. Transactions made with fraudulent cards or real cards which are used fraudulently account for billions of dollars of business losses each year.

While the scope of fraudulent activity is broad, it is believed that a small portion of the population is responsible for the majority of fraudulent activity. Accordingly, identifying the primary actors allows a significant amount of fraud to be avoided.

Accordingly, there is a need to identify devices which are associated with fraudulent activity to proactively address further fraudulent activities. Additionally, other devices which are associated with or have various features in common with devices associated with fraudulent activity may be monitored more closely than other devices in order to guard against fraudulent activity later on.

What is needed is a system for establishing identifiers for devices associated with fraudulent activity and leverage analysis of other devices to identify identifiers suggesting affiliation with devices associated with fraudulent activity.

SUMMARY

Therefore, it is an object of this disclosure to describe a method of identifying devices which may be associated with fraudulent activity.

It is a further object of the invention to describe a counter fraud system for comparing a device to a device associated with fraudulent activity and generate a score related to the degree of similarity between devices.

Embodiments of the present disclosure relate to a counter fraud system comprising a database containing device signatures associated with fraudulent activity. The system further comprises a first device comprising a processor and a computer readable medium storing instructions that, when executed by the processor, cause the first device to: record a plurality of identification parameter values, generate a first device signature including at least one identification parameter value; and transmit the first device signature to a server. The system also comprises a server in communication with the database wherein the server is configured to: receive the first device signature; compare the first device signature to device signatures associated with fraudulent activity stored on the database; and generate a confidence score based on the compared signatures.

Embodiments of the present disclosure relate to a risk assessment method, the method comprising: acquiring, by an application, information associated with a user device, the acquired information comprising a plurality of the following: Wi-Fi network names, Wi-Fi signal strength, GPS location, altimeter information, Bluetooth beacons, Bluetooth signal strength, Bluetooth enabled device names, cell tower identifiers, cell tower signal strength, device location history, device fingerprint, device name, operating system version, IP address, or information associated with an application installed on the user device. The method further comprises transmitting the acquired information to a server; comparing, by the server, the acquired information to stored information associated with fraudulent activity; and generating, by the server, a confidence score associated with the user device based on one or more similarities between the acquired information and the stored information, wherein the one or more similarities include common Wi-Fi network names, Wi-Fi signal strength, GPS location, altimeter information, Bluetooth beacons, Bluetooth signal strength, Bluetooth enabled device names, cell tower identifiers, cell tower signal strength, device location history, device fingerprints, device names, operating system versions, IP addresses, or information associated with applications.

Further embodiments of the disclosed system relate to a counter fraud system comprising: a computer network comprising at least one server; a user device in communication with the server and configured to record identifying parameters related to the user device; and a database of identifying parameters related to devices associated to with fraudulent activity. In some embodiments, the server is configured to: compare the identifying parameters related to the user device to the identifying parameters related to the devices associated with fraudulent activity; generate a score based on the compared identifying parameters; and challenge or deny a transaction based on the generated score.

Further features of the disclosed designs, and the advantages offered thereby, are explained in greater detail hereinafter with reference to specific example embodiments illustrated in the accompanying drawings.

DETAILED DESCRIPTION OF EXEMPLARY EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention Modern computing devices are inherently associated with a variety of identification parameters. By examining and/or recording identification parameter values associated with devices which were used to commit or were otherwise associated with fraudulent activity a device signature may be developed for the device associated with fraudulent activity. As more information is collected, a database containing device signatures associated with fraudulent activity may be developed. Once a robust database has been developed, a counter fraud system may be implemented that records identification parameter values associated with a device and generates a device signature for that device. The device signature may then be compared against the device signatures of devices associated with fraudulent activity and a confidence score may be generated based on this comparison. In some embodiments, if the confidence score is within a predetermined range, indicating that the device signature in question is similar to a device signature of a device associated with fraudulent activity, the counter fraud system may initiate security procedures. In some cases, the counter fraud system may block any transaction associated with that device. In some instances, if a credit card transaction is initiated using that device, the counter fraud system may contact the credit card owner to confirm that the owner would like to perform the transaction. It will be appreciated that a wide range of security features may be implemented upon determining that a device signature is correlated to a device signature associated with fraudulent activity.

Figure 1:
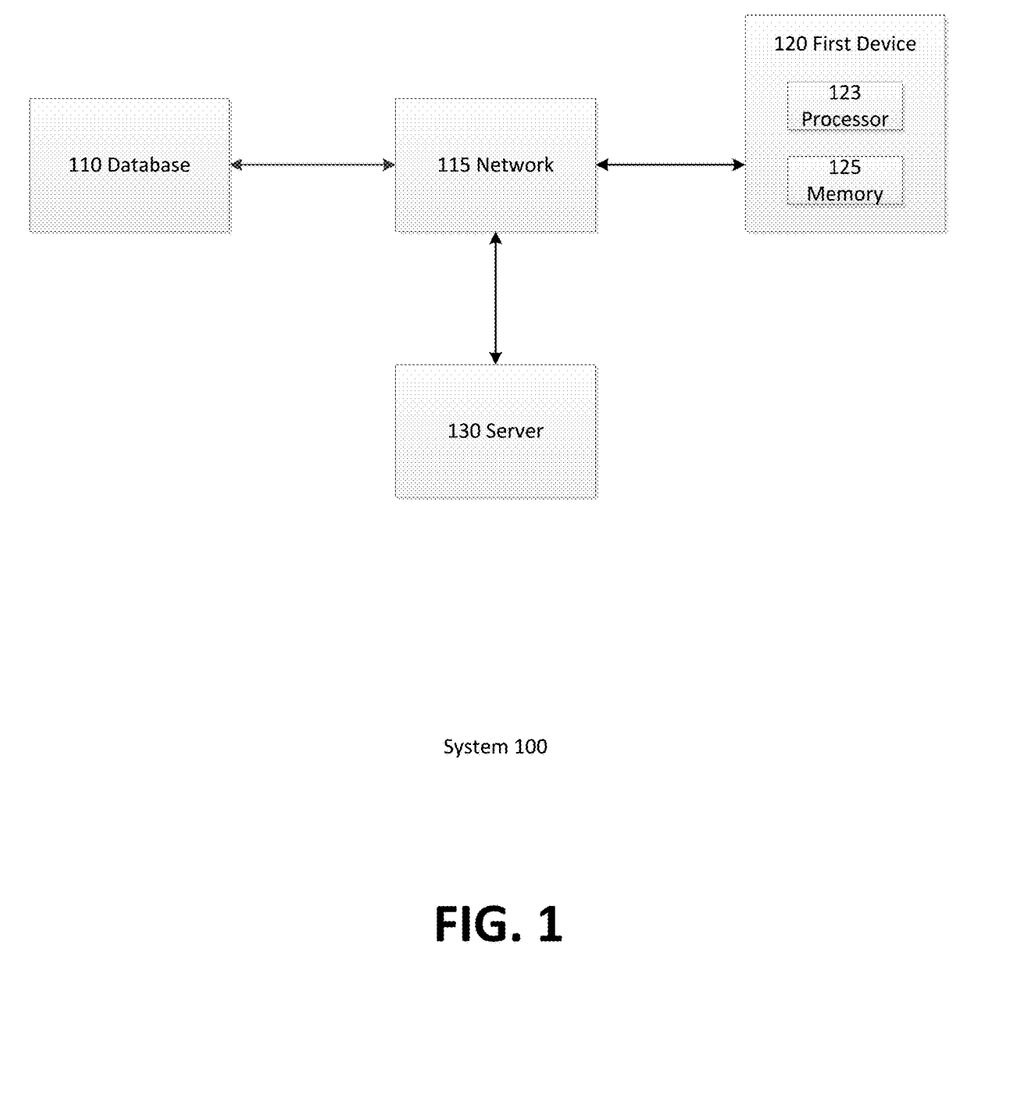
FIG. 1 illustrates a counter fraud system according to an example embodiment.

FIG. 1 illustrates an example embodiment of a disclosed counter fraud system 100. FIG. 1 depicts a database 110 which may be configured to contain device signatures associated with fraudulent activity. For example, if a fraudulent transaction is initiated using a mobile device, such as a smart phone, at least one and preferably a plurality of identification parameters associated with that smart phone may be recorded. A device signature may be generated based on the identification parameters.

Identification parameters may include, but are not limited to Wi-Fi network names, Wi-Fi signal strength, GPS location, altimeter information, Bluetooth beacons, Bluetooth signal strength, Bluetooth enabled device names, cell tower identifiers, cell tower signal strength, device location history, device fingerprint, device name, operating system version, IP address, and/or information associated with any application installed on the user device.

FIG. 1 also illustrates a first device 120 comprising a processor 123 and a memory 125. First device 120 may be, but is not limited to being, a network-enabled computer. As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client, a fat client, an Internet browser, or other device. First device 120 also may be a mobile device; for example, a mobile device may include an iPhone, iPod, iPad from Apple® or any other mobile device running Apple's iOS operating system, any device running Microsoft's Windows® Mobile operating system, and/or any other smartphone or like wearable mobile device.

In various examples according to the present disclosure, first device 120 may execute one or more applications, such as software applications, that enable, for example, network communications with one or more components of a system and transmit and/or receive data.

As shown in FIG. 1, the disclosed system 100 may include one or more networks 115. In some examples, network 115 may be one or more of a wireless network, a wired network or any combination of wireless network and wired network, and may be configured to connect first device 120, database 110, and/or server 130. For example, network 115 may include one or more of a fiber optics network, a passive optical network, a cable network, an Internet network, a satellite network, a wireless LAN, a Global System for Mobile Communication (GSM), a Personal Communication Service (PCS), a Personal Area Network, Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, network 115 may include, without limitation, telephone lines, fiber optics, IEEE Ethernet 902.3, a wide area network (WAN), a wireless personal area network, a local area network (LAN), or a global network such as the Internet. Network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, financial institution networks, and home networks.

FIG. 1 also illustrates a server 130. Although FIG. 1 illustrates a single server 130, some embodiments may contain multiple servers. In some examples, servers may include one or more processors, which may be coupled to memory. A server may be configured as a central system, server, or platform to control and call various data at different times to execute a plurality of workflow actions. A server may be configured to connect to the one or more databases and/or at least one client device, communication device, and/or mobile device.

As shown in FIG. 1, server 130 is in two-way data communication with database 110 and first device 120 through network 115. In some embodiments, server 130 may be in one-way communication with first device 120. Although FIG. 1 illustrates single instances of the components, embodiments of the disclosed system 100 may include any number of components.

In operation, a database may contain a number of device signatures associated with fraudulent activity. In one example, a fraudster may initiate, execute, and/or complete a fraudulent transaction using a mobile device. In this example, the fraudster may perform this fraudulent activity while at his residence. Upon detecting the fraudulent activity, various identification parameters associated with the device used to commit the fraudulent activity may be recorded. For example, the name of the Wi-Fi network the fraudster was using to commit the fraud may be recorded. Any other Wi-Fi networks visible to the fraudster's device may also be recorded along with the signal strength of each of those networks. The names and associated signal strengths of any visible Bluetooth beacons or devices may also be recorded. From this information alone, a device signature may be developed for the fraudster's device, even if one or more parameters are spoofed. If the device is in view of a plurality of Wi-Fi networks, it is statistically unlikely that another device, located remotely from the fraudster's device would be in view of the same or even a similar group of Wi-Fi networks with the same or similar names. The device signature may be further refined by recording the names and/or identification numbers of any cellular towers in view of the fraudster's device. As with Wi-Fi networks, recording the ID a plurality of cellular towers and their respective signal strengths alone allows for a relatively specific device signature. In some embodiments, GPS location and/or altitude may also be recorded. Many devices contain an identifying device finger print in addition to a device name. Other information which may be used to develop a device signature may include information related to the operating system, operating system version, or other applications stored on the device. Using this information, a highly specific device signature may be created for the fraudsters device. This signature, and/or associated information may be recorded in a database to be compared with other device information in the future.

If the same fraudster from the previous example obtains a new device and attempts to perform fraudulent activity, the device signature of the new device may have similarities to the previously identified device associated with fraudulent activity. For example, if the fraudster attempts to perform a fraudulent transaction from his residence again, the visible Wi-Fi networks and relative strengths of those networks will be the same or similar. The cellular towers visible to the device and their respective signal strengths will also be the same or similar. If the fraudster is using the device in a similar manner as the previous device, a similar pattern or applications may be apparent on the device.

In some embodiments, the history of usage of applications on the device may be incorporated into a device signature as well. For example, if a fraudster uses his personal device to commit fraudulent activity, the fraudster may also play his favorite game or visit the same set of websites on that same device, such that publicly accessible cookies or other flags may be apparent. Alternately, access to such tracking items may be a condition to access the financial service platform, for the limited purpose of generating anti-fraud profiles. If the new device shows similar application usage history, such as the fraudster spending time playing his favorite game, or visiting the same set of websites, that information may be used to identify similarities in the device signatures.

Once a significant database of device signatures associated with fraudulent activity is developed, it may be used as a background test for other suspicious devices.

In some embodiments, a payment application, such as a digital wallet, may be used to perform a transaction. In such embodiments, the application may be configured to gather, record, and/or transmit identification parameters related to a device executing the application. In some embodiments, the application, or other form of computer executable instructions may cause the device to perform steps related to detecting fraud.

Figure 2:
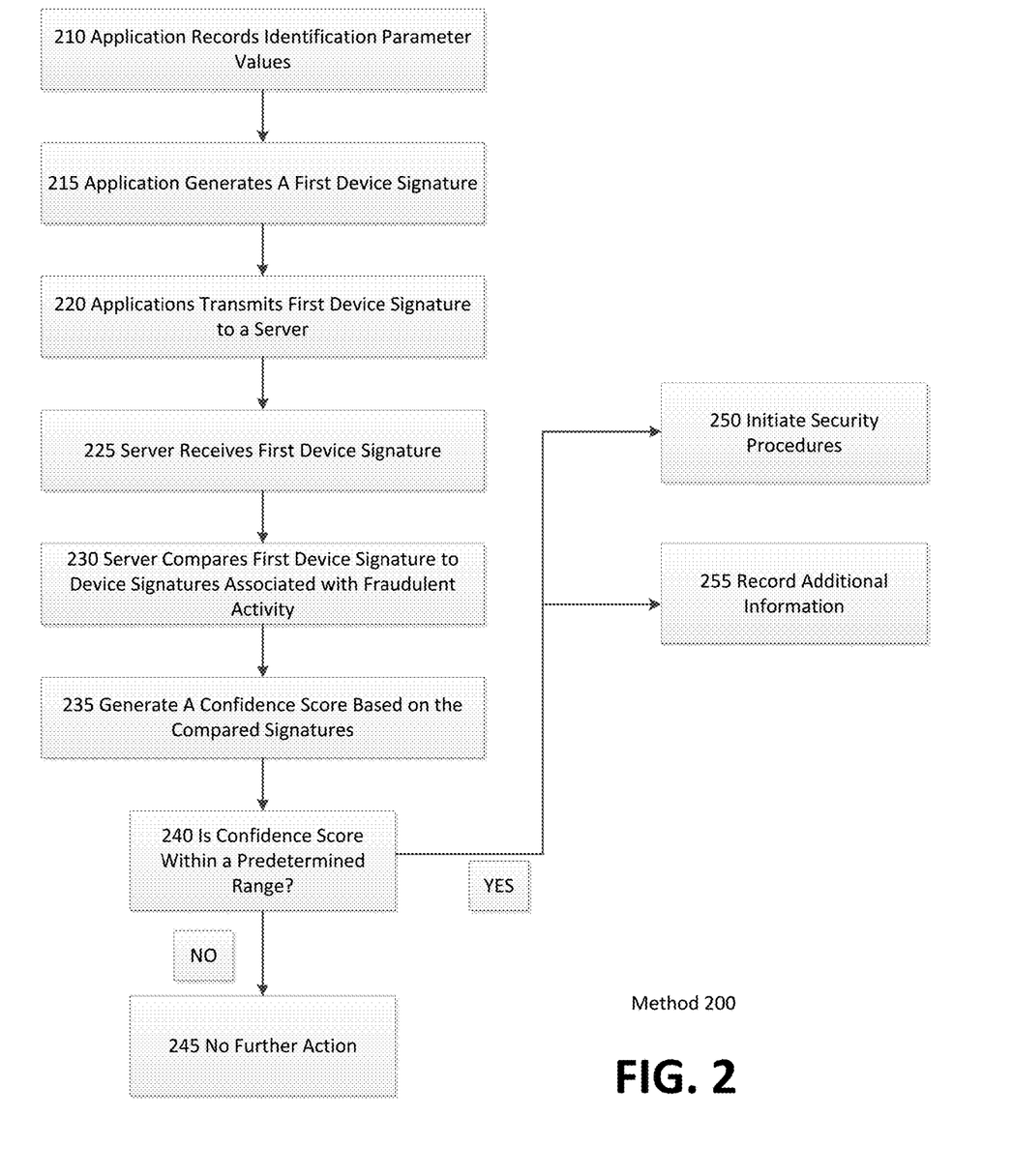
FIG. 2 is a flowchart illustrating the operation of a counter fraud system according to an example embodiment.

FIG. 2 is a flow chart illustrating an exemplary embodiment of the operation of a counter fraud system. Method 200 may reference the same or similar components as illustrated in FIG. 1. In step 210, a first device and/or an application or program being executed by a first device, records a plurality of identification parameter values. This action may be performed as part of the normal operations of the device and/or application whether or not the device is suspected of being involved or related to any fraudulent activity. In some examples, an application may be designed to request identification parameter values from the device running the application or the device operating system. As the application may request identification parameter values from the device or device operating system directly, the potential for the application to receive spoofed information is reduced. In some examples, a server may request identification parameter values from one or multiple devices in a communication path. By requesting identification parameter values from multiple devices in a communication path, the consequence of a single device providing spoofed or otherwise inaccurate information is reduced. In step 215, the application generates a first device signature including at least one identification parameter value. In some embodiments, a device signature may include, but is not limited to, a list of comma separated values, a matrix of values, and/or a hash function. In a non-limiting example, a device signature may include ten Wi-Fi network names and associated signal strengths, five cell tower IDs and associated signal strengths, ten Bluetooth beacon names and associated signal strengths, as well as ten applications sorted by use time, five GPS locations sorted by time spent at each location, and/or a device fingerprint.

In FIG. 2, step 220, the first device and/or application being executed by the first device, transmits the first device signature to a server. In some examples, a server may actively acquire a first device signature and/or any identification parameter values underlying a device signature in order to avoid collecting or relying on spoofed or fraudulent data. The server is in data communication with a database containing a plurality of device signatures which are associated with prior fraudulent activities. In step 225, the server receives the first device signature and, in step 230 compares the first device signature to device signatures associated with fraudulent activity stored in the database. By comparing the first device signature against the device signatures known to be associated with fraudulent activity, in step 235, the server may generate a confidence score based on the compared signatures. In some embodiments, a higher confidence score may indicate a closer match to one or multiple device signatures known to be associated with fraudulent activity. In some embodiments, a confidence score may be developed using a machine learning algorithm and/or computer model. In some embodiments, the confidence score reflects a vast number of variables and relationships between the first device signature and a plurality of device signatures associated with fraudulent activity.

In step 240, the server may determine if the confidence score is within a predetermined range including, for example, above a predetermined threshold. If the determination is no, then, in step 245, the server may determine that no further action is necessary. If the determination is yes, in step 250, the server may initiate security procedures. In some embodiments, if the server determines the confidence score is within a predetermined range, the server may, in step 255 record additional information associated with the first device and/or the user of the first device and/or instruct the application to record additional information associated with the first device and/or user of the first device.

In some embodiments, an application may record information regarding the human user of a device. Such information may include, but is not limited to, input characteristics such as tying speed, rhythm, error rate, and such, a voice and/or vocal fingerprint, information related to behavioral patterns, and/or information related to device usage.

Information related to behavioral patterns may include a wide variety of information which may be available to the first device and/or an application running on the first device. Such information may include, but is not limited to patterns of movement. For example, a user may generally travel from his residence to his place of work most days between 7:30 and 8:00 am. In this example, the user's behavior of traveling from one known location to another known location at approximately the same time is one aspect of a behavioral pattern. That user may also leave his place of work at approximately the same time most days. The user may travel to a known third location such as a gym, bar, or restaurant, multiple times a week after leaving work. The user may generally return to his residence at approximately the same time several times per week. Over time behavior patterns may develop showing a different pattern on days the user does not have work. Behavior patterns may include a particular mode of transportation and/or general speed traveled. For example, a user may routinely take the bus to work, which would be distinct from a user who left approximately the same first location and traveled to the same second location, but traveled by car or on foot. At a more granular level, individual users may walk at different speeds, frequent different locations, connect to different Wi-Fi networks and/or engage in a wide array of other behavioral patterns.

A vast number of factors may be taken into account when analyzing behavioral information. In some embodiments, any and/or all of these potential behavioral information factors may be provided to a machine learning algorithm and/or computer model in order to develop a behavioral information fingerprint associated with a particular device. In some embodiments of the disclosed system, a behavioral information fingerprint is incorporated into a device signature. In some embodiments, multiple individual behavioral information factors are additionally or alternatively incorporated into a device signature In some systems or deployments, every device which executes a payment and/or digital wallet application will gather, record, and/or transmit a device signature to be compared against device signatures associated with fraudulent activity. If the comparison results in a confidence score above a predetermined threshold, additional security measures may be implemented.

In some embodiments, when initiates a transaction using a device with a device signature confidence score above a certain threshold, the transaction may be interrupted and the user may be challenged with additional security procedures. In some embodiments, the user may be required to provide a second factor authentication, user identification verification, and/or financial information verification.

For example, a user initiating a transaction using a digital wallet may be asked to enter a code which has been sent to the user's cell phone and/or email on record with a financial institution. If the user initiating the transaction is the authorized user, it is likely that user will have access to the mobile device on file and/or email address on file. If the user has fraudulently obtained the authorized user's payment information and is attempting to make a fraudulent transaction, they are less likely to be able to provide the required second factor authentication.

In another example, a user initiating a transaction using a payment application may be asked to provide identification verification such as entering the user's driver's license number or other number associated with a form of identification. In some embodiments, the user may be required to take a photograph of the identification and transmit the photo using the payment application. If the authorized user is attempting to make the transactions, it is likely they will have access to a form of identification which can be used to authenticate the transaction. If the user is attempting to make a fraudulent transaction, they may not be able to provide the necessary identification and the fraudulent transaction may be blocked.

In another example, a user initiating a transaction may be asked to provide financial information verification such as entering a full credit card number of the card being used to make the transaction. In some embodiments, the user may be challenged by a request to enter the security code, expiration date, and/or zip code associated with the card. In some embodiments, the user may be asked to transmit a picture of the front and/or back of the credit card in order to proceed with the transaction. In each case, if the user attempting to make the transaction is the authorized user, they are likely to be able to meet the challenge of the security procedures and provide the requested information with minimal interruption to the transaction process. If the user is attempting to make a fraudulent transaction the transaction may be cancelled.

If a device is determined to have been used to make or attempt a fraudulent transaction, the device signature and/or identification parameters associated with that device may be transmitted to a server and/or incorporated into a database of devices and/or device signatures associated with fraudulent activity.

If the user continues to use a device after a fraudulent transaction has been detected and/or the user fails to respond to a security challenge, additional information about the user and/or device may be acquired by the server. In some embodiments, of the system, a user signature may be developed and/or incorporated into a database of user signatures associated with fraudulent activity. It will be appreciated that a user signature may be developed without knowing the identity of the user.

A user signature may be developed based on behavioral information and device usage as discussed herein. As a condition of use of the financial services application, biometric information about the individual user may also be collected and utilized to form a user signature such as, for example, a vocal fingerprint. In some embodiments, a vocal fingerprint may be developed if the user elects to use voice commands. In some embodiments, a vocal fingerprint may be developed using a machine learning algorithm. A vocal fingerprint may incorporate the tone, pitch, rhythm, vocabulary, and/or accent of the user's voice.

In some embodiments, a database of user signatures associated with fraudulent activity may be developed. When a user utilizes a device to make a transaction, that user's user signature may be compared against the database and a confidence score may be generated showing similarities between a user signature and one or more user signatures associated with fraudulent activity.

Figure 3:
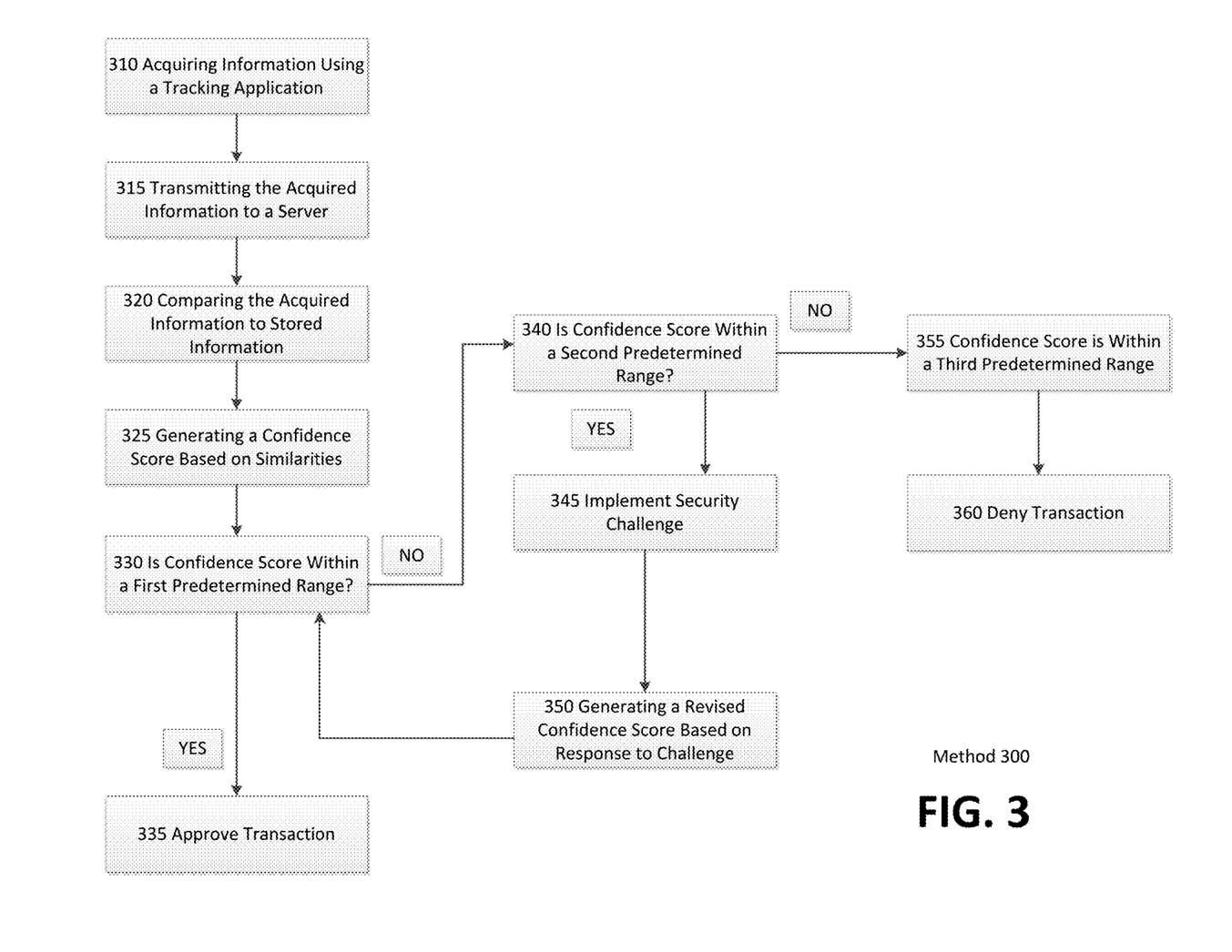
FIG. 3 is a flowchart illustrating the operation of a counter fraud system and application according to an example embodiment.

FIG. 3 is a flow chart illustrating an exemplary embodiment of the operation of a risk assessment system. Method 300 may reference the same or similar components as illustrated in FIG. 1 and FIG. 2. Method 300 comprises, in step 310, acquiring information associated with a user device. The information is acquired using an application which may include, for example, a payment application and/or digital wallet with the necessary capabilities. The information acquired includes, but is not limited to Wi-Fi network names, Wi-Fi signal strength, GPS location, altimeter information, Bluetooth beacons, Bluetooth signal strength, Bluetooth enabled device names, cell tower identifiers, cell tower signal strength, device location history, location data, device fingerprint, device name, operating system version, IP address, usage data, and/or information associated with an application installed on the user device.

In some embodiments, the acquired information is analyzed using machine learning techniques in order to generate a device signature for the user device.

In step 315, the user device transmits the acquired information to a server. Upon receiving the information, in step 320, the server compares the acquired information to stored information which is associated with fraudulent activity. The stored information associated with fraudulent activity may be stored on the server itself or on a database which is in data communication with the server. In step 325, the server generates a confidence score associated with the user device based on one or more similarities between the acquired information and the stored information. The similarities which the confidence score is based on may include, but are not limited to common Wi-Fi network names, Wi-Fi signal strength, GPS location, altimeter information, Bluetooth beacons, Bluetooth signal strength, Bluetooth enabled device names, cell tower identifiers, cell tower signal strength, device location history, location data, device fingerprints, device names, operating system versions, IP addresses, usage data, and/or information associated with applications.

Once a confidence score has been generated, in step 330, a server determines if the confidence score is within a first predetermined range. If the answer is yes, in step 335, the server or another device approves a transaction associated with the user device. If the answer is no, in step 340, the server determines if the confidence score is within a second predetermined range. If the answer is yes, in step 345, the server implements a security challenge. Security challenges may include, but are not limited to, second factor authentication, identification verification, vocal fingerprint and/or facial recognition verification. In some embodiments a security challenge may include requiring the user to gesture near the user device with a contactless card which is configured to authenticate the user's identity. In some embodiments, the security challenge may include requiring the user to submit biometric information such as a finger print, vocal sample, and or images of the user's face for facial recognition verification.

In some embodiments, in step 350, the server generates a revised confidence score based on the user's response to the security challenge. If the user provides the required information, the revised confidence score may be within the first predetermined range and the transaction may be approved.

If the confidence score is not within a second predetermined range, in step 355, the server determines that the confidence score is within a third predetermined range and, in step 360, the server denies a transaction. In some embodiments, the third predetermined range may include any confidence score below a certain threshold, the first predetermined range may include any confidence score above a certain threshold, and the second predetermined range may be any confidence score between the first and third predetermined ranges.

In some embodiments the server may generate and/or revise a confidence score for a second device based on the generated and/or revised confidence score associated with the user device. For example, a server or plurality of servers of the disclosed risk assessment system may analyze acquired information and/or device signatures associated with a plurality of devices. The system may establish that two or more devices are closely associated with each other based on similarities in acquired information, device signatures, and/or other common identification parameters. The system may make determinations regarding relationships or associations between multiple devices using machine learning algorithms and/or a computer model. If a user device is closely linked with a second device, and the user device is determined to be associated with fraudulent activity, the confidence score of the second device may be negatively impacted. Conversely, if the user device is presented with a security challenge and the user responds correctly, the confidence score of the second device, and any other closely linked devices, may be positively impacted. Using a popular application, a wide network of devices may be developed based on similarities and/or commonalities between various identification parameters.

Figure 4:
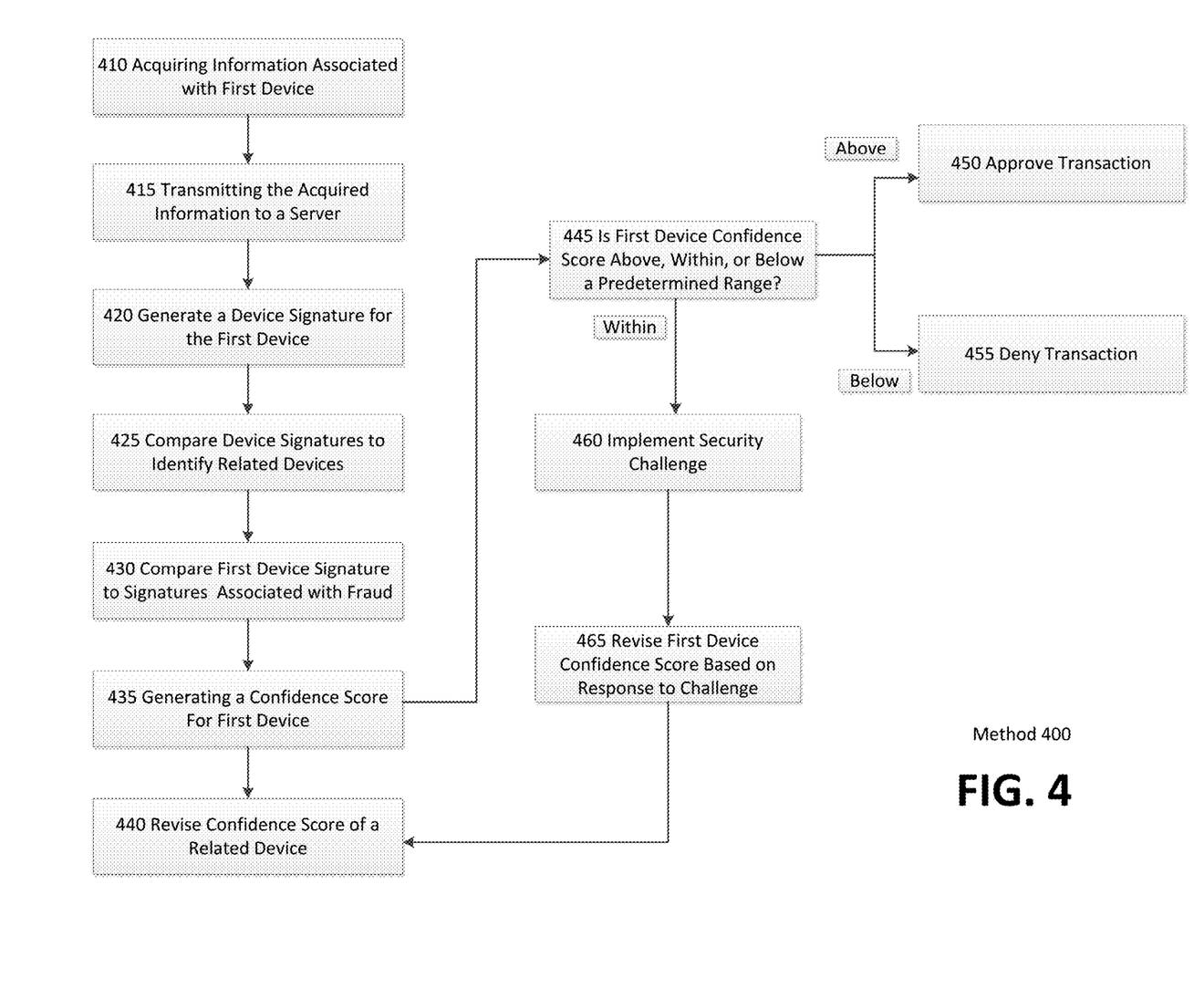
FIG. 4 is a flowchart illustrating the operation of a counter fraud system and security challenge according to an example embodiment.

FIG. 4 is a flow chart illustrating an exemplary embodiment of the operation of a networked risk assessment system. Method 400 may reference the same or similar components as illustrated in FIG. 1, FIG. 2, and FIG. 3. Method 400 comprises, in step 410 acquiring information associated with a first device. The information acquired may include any acquired information and/or identification parameters described herein. In step 415, the acquired information is transmitted to a server and analyzed using machine learning techniques to, in step 420, generate a device signature for the first device. In step 425, the server compares the device signature of the first device to a plurality of stored device signatures in order to identify related devices. In some embodiments, devices may be categorized as closely related, distantly related, or not related.

In step 430, the server compares the device signature of the first device to stored device signatures associated with fraudulent activity and, in step 435 generates a confidence score associated with the first device based on the comparison.

In step 440, the server revises a confidence score associated with any related device based on the confidence score of the first device. In some embodiments, the revision to the confidence score of a related device may depend, at least in part, on how closely related the related device is to the first device. For example, if the related device is very closely related, its confidence score may be more strongly revised than if the related device is only somewhat related to the first device.

Once a confidence score has been generated for the first device, in step 445, a server determines if the confidence score is above, within, or below a predetermined range. If the confidence score is above a predetermined range, in step 450, the server approves a transaction. If the confidence score is below a predetermined range, in step 455, the server denies a transaction. If the confidence score is within a predetermined range, in step 460, the server implements a security challenge. Based on the user's response to the security challenge, in step 465, the server revises the confidence score for the first device and also revises the confidence score of any related devices.

Figure 5A:
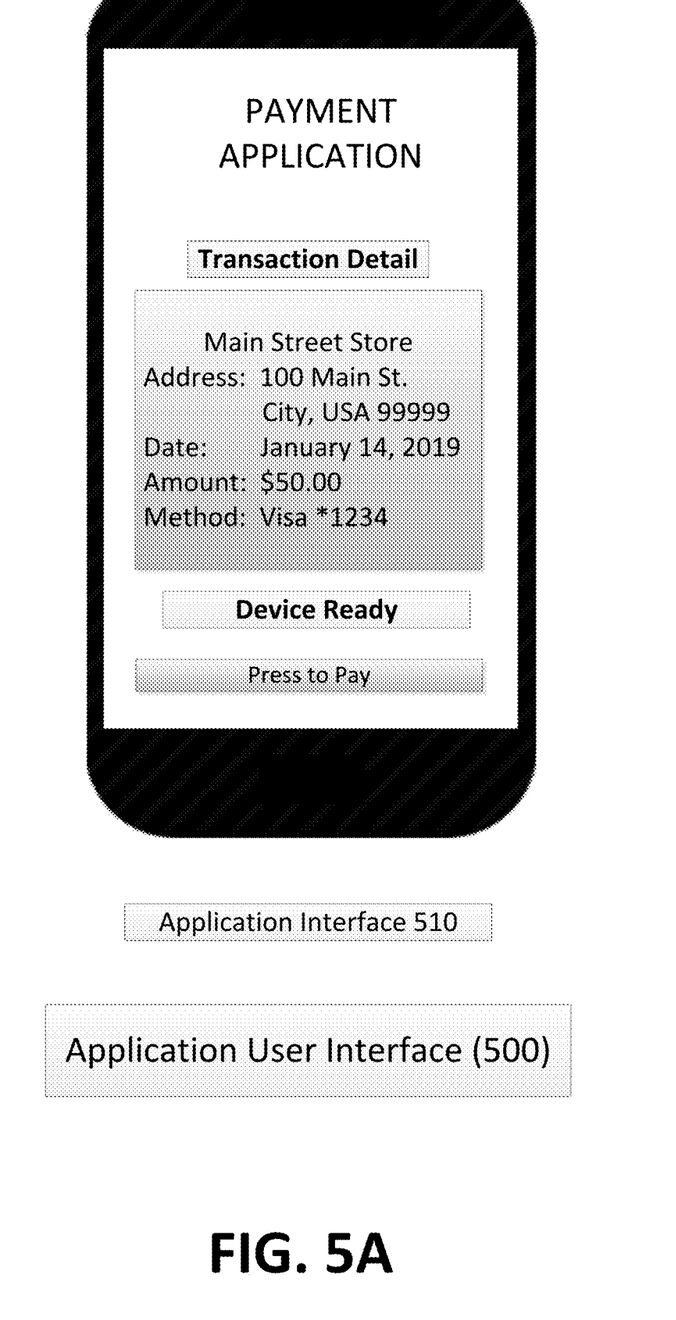
FIGS. 5A-5D illustrate a series of application user interfaces according to example embodiments.

FIG. 5A shows an example of an application user interface 500 of an example embodiment of the disclosed system. The application interface 510 may display, without limitation, a merchant name, merchant location, transaction date, transaction time, transaction amount, and payment information.

Figure 5B:
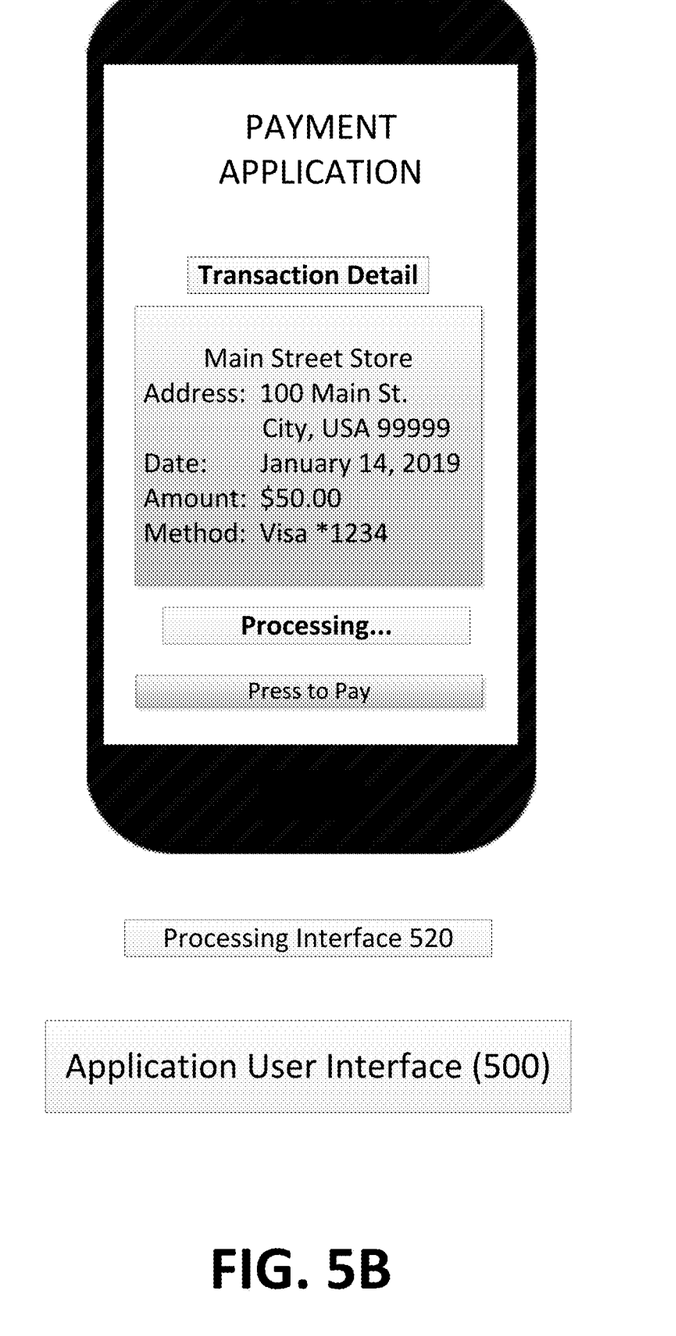

In some embodiments, as shown in FIG. 5B, the device may display a processing interface 520 while a device signature and/or confidence score is generated for the device being used for a transaction. As described herein, if the confidence score is within a predetermined range, a security challenge may be implemented.

Figure 5C:
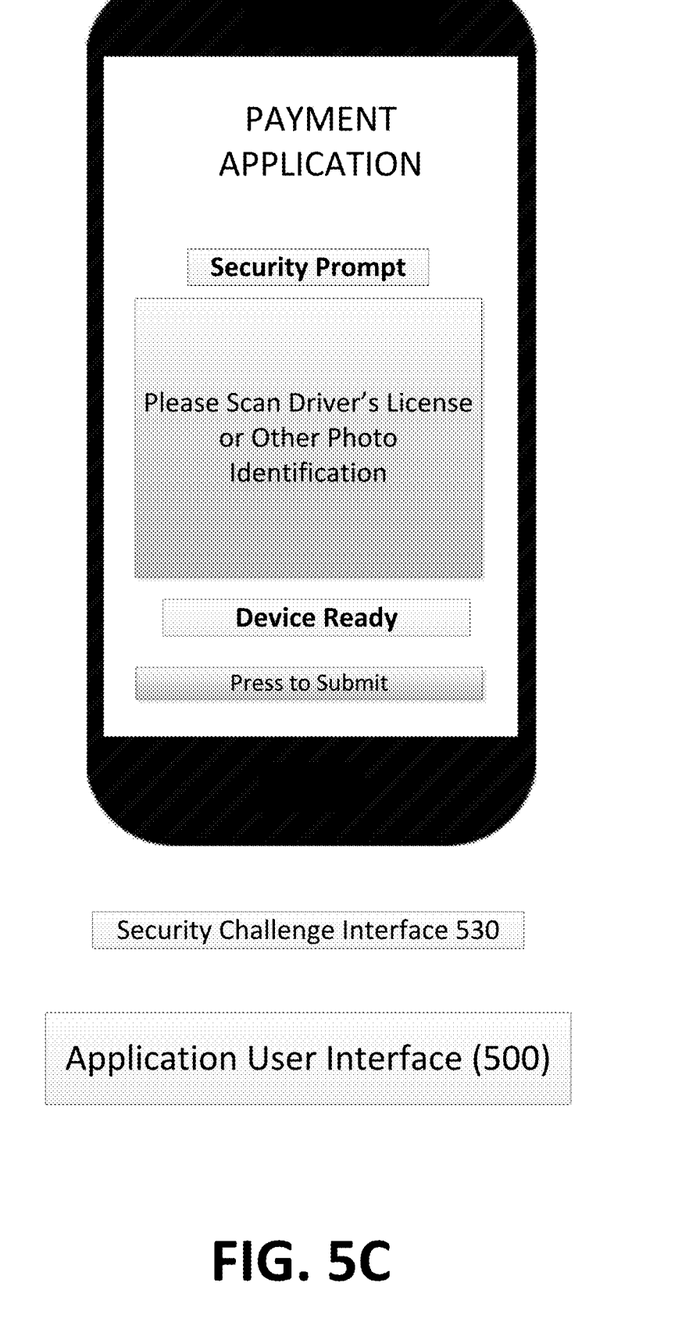

As shown in FIG. 5C, a security challenge interface 530 may prompt the user to scan his driver's license or other photo ID in order to verify the identity of the user. It will be appreciated that many other security challenges may be presented to the user through a security challenge interface. In the example shown in FIG. 5C, the user may authenticate his identify by taking a photograph of his photo ID. If the user submits a photo of an identification matching the authorized user the payment application may approve the transaction. It will be appreciated that the application and/or related programs or servers may analyze a submitted photograph as showing the name, date of birth, address, and/or other information associated with the authorized users. The photograph may also be analyzed to determine, using facial recognition software, if the submitted photograph shows the authorized user. In some embodiments, data associated with the picture such as the time, date, and location the picture was taken may also be analyzed in order to confirm that the submitted image is genuinely a photograph which was taken in response to the security challenge. In some embodiments, the submitted image will be analyzed to determine that it was taken with a camera application and is not a screen shot of a previously saved image.

Figure 5D:
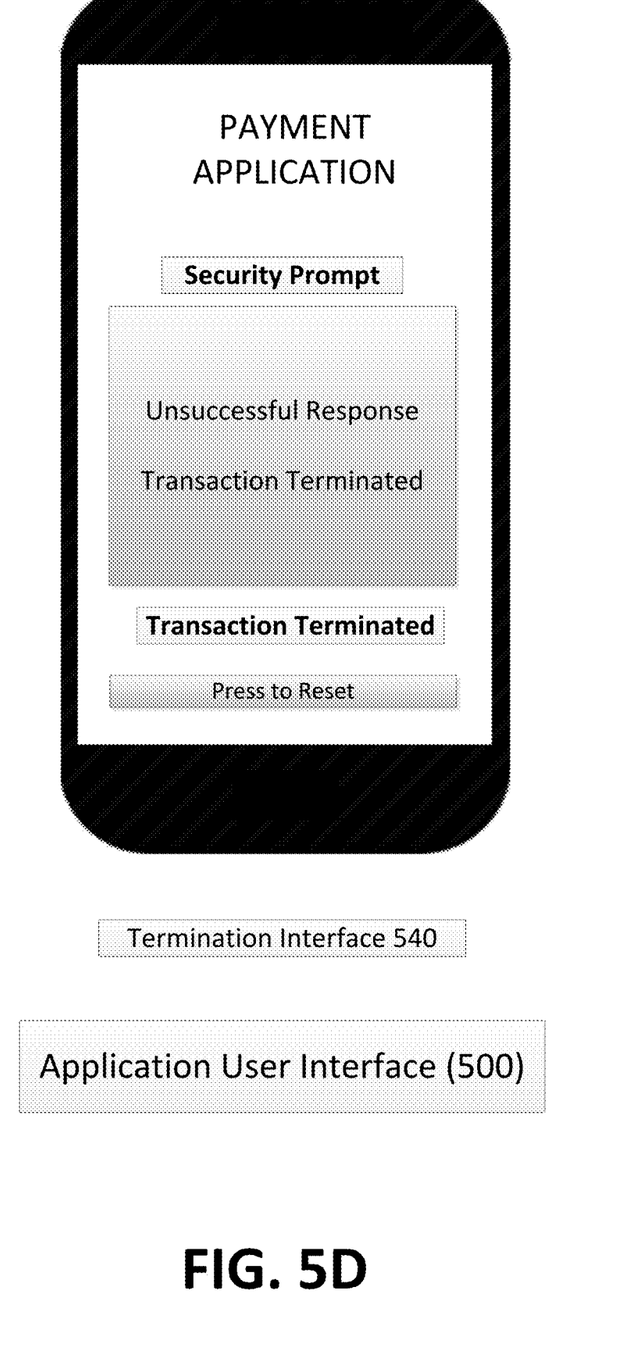

As shown in FIG. 5D, if the user does not successfully respond to the security challenge, a termination interface 540 may show that the transaction has been terminated. In some embodiments, following an unsuccessful response to a security challenge, a confidence score associated with the device may be revised indicating that it is more likely the device may be used for fraudulent transactions. In some embodiments, the termination interface 540 allows the user to reset the application in order to begin the transaction again. Over time, it is anticipated that an authorized user will occasionally fail to respond to a security challenge successfully. If the user resets the application and successfully responds to a security challenge, the confidence score associated with the device may again be revised, thereby lowering the degree of scrutiny applied to that device.

In some embodiments, a confidence score will be account for both location related identification parameters as well as user related identification parameters. In some embodiments, if one individual in a household is using a device for fraud, other individuals in the house hold may have confidence scores that reflect that individual user's non-fraudulent use of a device despite a high degree of similarity in location related identification parameters. In some embodiments, individual users who share similar location related identification parameters may be distinguished based on device usage information, conflicting location information, and/or biometric information.

In some instances, if a fraudulent transaction is blocked and/or detected at a particular location, other potential users may who are within a predetermined distance may be notified. For example, if digital wallet application is used to attempt a transaction and the transaction is blocked based on the fraudster failing a security challenge, other users of the same and/or related digital wallet applications who are within a certain distance of the fraudster may receive a push notification. In some embodiments, users who are within 100 feet of the location of the fraudulent transaction may be notified. In some embodiments users who are within 1,000 feet of the attempted fraudulent transaction may be notified.

In some embodiments, if an application, such as, for example, a payment application transmits data to a server and it is determined that a device has a confidence score associated with fraudulent activity, the application may refuse to function. In such embodiments, devices which are believed to be a significant fraud risk may be stopped from ever being used to make a transaction. In some embodiments, if a tracking application determines, or receives information, that a device represents a significant fraud risk, the tracking application may record biometric data regarding the user consistent with any user license agreements. In some embodiments, if an application receives information that a device represents a significant risk of fraud, the application may send a notice to third parties, for example, third party payment applications. In some embodiments, if a payment application receives notice that a device represents a significant risk of fraud, the payment application may delete itself from the device and/or prevent the device from downloading that particular payment application and/or any other payment applications in the future.

Throughout the specification, reference is made to device signatures. It will be understood that a device signature may be any data, information, table, chart, comma separated value, and/or file which contains information which may be used, directly or indirectly, to identify some aspect of a device. A device signature may include identification parameter values, user information, behavioral information, device usage information, and/or combinations thereof. A device signature may also contain abstractions, references, and/or truncations of identification parameter values, user information, behavioral information, device usage information, and/or combinations thereof.

Throughout the specification, reference is made to a confidence score or confidence scores. It will be understood that a confidence score may be any indicator of similarity and/or commonality to another device or set of devices. In some embodiments, the confidence score may be an indicator of the degree of risk associated with a particular device. In some embodiments, the confidence sore associated with a device may be revised without limitation, periodically, based on transaction history, based on response to security questions, based on the actions of related devices, and/or any combination thereof.

The present disclosure is not to be limited in terms of the particular embodiments described in this application, which are intended as illustrations of various aspects. Many modifications and variations can be made without departing from its spirit and scope, as may be apparent. Functionally equivalent methods and systems within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A counter fraud system comprising:
a database containing device signatures associated with fraudulent activity;
a first device comprising a processor and a computer readable medium storing instructions that, when executed by the processor, cause the first device to:
record a plurality of identification parameter values, the plurality of identification parameter values including an application usage history, an identification of a plurality of communication networks, and a behavior pattern, wherein:
the application usage history comprises one or more cookies indicative of a browsing history and a program usage, and
the behavior pattern comprises a pattern of travel between a first location and a second location and a speed of travel between the first location and the second location;
generate a first device signature including the application usage history and the behavior pattern; and
transmit the first device signature to a server;
a server in communication with the database wherein the server is configured to:
receive the first device signature;
compare the first device signature to device signatures associated with fraudulent activity stored in the database; and
generate a confidence score based on the compared signatures.

2. The counter fraud system of claim 1, wherein the server is further configured to initiate security procedures if the confidence score is within a predetermined range.

3. The counter fraud system of claim 2, wherein the security procedures comprise one of second factor authentication, user identification verification, or financial information verification.

4. The counter fraud system of claim 1, wherein the server is further configured to record additional information associated with the user if the confidence score is within a predetermined range.

5. The counter fraud system of claim 1, wherein the identification parameter values comprise at least one of a cell tower identifier, a GPS location, an altitude, a Bluetooth beacon, a Bluetooth enabled device name, a Wi-Fi network name, a Wi-Fi signal strength, a location history, a device fingerprint, a device name, an operating system version, an IP address, or information associated with an application installed on the first device.

6. The counter fraud system of claim 1, wherein the first device signature includes user profile information acquired from an account associated with the user.

7. The counter fraud system of claim 1, wherein the first device signature includes at least one of vocal information, behavioral information, or device usage information.

8. The counter fraud system of claim 1, wherein the server is configured to compare location information associated with the first device to location information associated with fraudulent activity.

9. A risk assessment method, the method comprising:
acquiring, by an application, information associated with a user device, the acquired information comprising an identification of a plurality of communication networks, a usage history associated with the application, a behavior pattern, and at least one selected from the group of the following: Wi-Fi network names, Wi-Fi signal strength, GPS location, altimeter information, Bluetooth beacons, Bluetooth signal strength, Bluetooth enabled device names, cell tower identifiers, cell tower signal strength, device location history, device fingerprint, device name, operating system version, IP address, and information associated with an application installed on the user device, wherein:
the application usage history comprises one or more cookies indicative of a browsing history and a program usage, and
the behavior pattern comprises a pattern of travel between a first location and a second location and a speed of travel between the first location and the second location;
transmitting the acquired information to a server;
comparing, by the server, the acquired information to stored information associated with fraudulent activity; and
generating, by the server, a confidence score associated with the user device based on one or more similarities between the acquired information and the stored information,
wherein the one or more similarities include a plurality selected from the group of the following: common identifications of a plurality of communication networks, Wi-Fi network names, Wi-Fi signal strength, GPS location, altimeter information, Bluetooth beacons, Bluetooth signal strength, Bluetooth enabled device names, cell tower identifiers, cell tower signal strength, device location history, device fingerprints, device names, operating system versions, IP addresses, information associated with applications, common usage histories associated with applications, and common behavior patterns.

10. The risk assessment method of claim 9, further comprising approving a transaction associated with the user device if the confidence score is within a first predetermined range.

11. The risk assessment method of claim 9, further comprising implementing a security challenge if the confidence score is within a second predetermined range.

12. The risk assessment method of claim 11, further comprising revising the confidence score based on a user response to a security challenge.

13. The risk assessment method of claim 11, wherein the security challenge requires a user to gesture near the user device with a contactless card.

14. The risk assessment method of claim 11, wherein the security challenge requires a user to submit biometric information.

15. The risk assessment method of claim 9, further comprising denying a transaction if the confidence score is within a third predetermined range.

16. The risk assessment method of claim 9, further comprising generating a confidence score for a second device based on the confidence score associated with the user device.

17. The risk assessment method of claim 9, wherein the acquired information is analyzed using machine learning to generate a device signature.

18. A counter fraud system comprising:
a computer network comprising at least one server;
a user device in communication with the server and configured to record identifying parameters related to the user device, wherein the identifying parameters include:
 an application usage history comprises one or more cookies indicative of a browsing history and a program usage,
 a behavior pattern comprising a pattern of travel between a first location and a second location and a speed of travel between the first location and the second location, and
 an identification of a plurality of communication networks; and
a database of identifying parameters related to devices associated to with fraudulent activity;
wherein the server is configured to:
 compare the identifying parameters related to the user device to the identifying parameters related to the devices associated with fraudulent;
 generate a score based on the compared identifying parameters; and
 challenge or deny a transaction based on the generated score.

19. The counter fraud system of claim 1, wherein the behavior pattern further comprises a mode of transportation between the first location and the second location.

20. The risk assessment method of claim 9, wherein the behavior pattern further comprises a mode of transportation between the first location and the second location.

* * * * *